(12) United States Patent
Pair et al.

(10) Patent No.: US 7,983,840 B2
(45) Date of Patent: *Jul. 19, 2011

(54) SYSTEM AND METHOD FOR MOTION-BASED CONTROL OF ELECTRONIC DEVICES

(75) Inventors: Craig Pair, Central City, AR (US); Michael Kaelin, Fort Smith, AR (US)

(73) Assignee: Hi-Tech Products, Inc., Fort Smith, AR (US)

( * ) Notice: Subject to any disclaimer, the term of this patent is extended or adjusted under 35 U.S.C. 154(b) by 1426 days.

This patent is subject to a terminal disclaimer.

(21) Appl. No.: 11/473,330

(22) Filed: Jun. 23, 2006

(65) Prior Publication Data

US 2007/0010943 A1   Jan. 11, 2007

Related U.S. Application Data

(63) Continuation-in-part of application No. 10/875,918, filed on Jun. 24, 2004, now Pat. No. 7,640,101.

(51) Int. Cl.
   *G01C 21/26* (2006.01)
(52) U.S. Cl. .................. 701/213; 701/36; 342/357.06
(58) Field of Classification Search .......... 701/207–209, 701/213, 21, 36; 340/989–993; 342/357.01–357.12; 455/456.1–456.6
See application file for complete search history.

(56) References Cited

U.S. PATENT DOCUMENTS

| | | | |
|---|---|---|---|
| 5,032,828 A | 7/1991 | Hirose et al. | |
| 5,148,153 A | 9/1992 | Haymond | |
| 5,404,443 A | 4/1995 | Hirata | |
| 5,541,572 A | 7/1996 | Okamoto et al. | |
| 5,949,345 A | 9/1999 | Beckert et al. | |
| 6,122,682 A | 9/2000 | Andrews | |
| 6,574,531 B2 | 6/2003 | Tan et al. | |
| 6,690,940 B1 | 2/2004 | Brown et al. | |
| 7,050,907 B1 | 5/2006 | Janky et al. | |
| 7,064,656 B2 | 6/2006 | Belcher et al. | |
| 7,336,227 B2 | 2/2008 | Durst et al. | |

OTHER PUBLICATIONS

Craig Pair et al.; Information Disclosure Statement filed in U.S. Appl. No. 10/875,918; Jun. 24, 2004; 2 pages; USA.
USPTO; Office Action issued in U.S. Appl. No. 10/875,918; Jul. 1, 2008; 6 pages; USA.
Craig Pair et al.; Amendment filed in response to Jul. 1, 2008 Office Action in U.S. Appl. No. 10/875,918; Sep. 17, 2008; 11 pages; USA.
Craig Pair et al.; Third-Party Citation of Prior Art Under 37 CFR 1.99 filed in U.S. Appl. No. 10/875,918; Aug. 1, 2006; 5 pages; USA.
USPTO; Office Action issued in U.S. Appl. No. 10/875,918; Nov. 26, 2008; 5 pages; USA.
Craig Pair et al.; Amendment filed in response to Nov. 26, 2008 Office Action in U.S. Appl. No. 10/875,918; Jan. 6, 2009; 13 pages; USA.

*Primary Examiner* — Richard M. Camby
(74) *Attorney, Agent, or Firm* — Baker & Daniels LLP (57) ABSTRACT

Embodiments of the present invention are directed to a method and system for disabling distracting features of electronic devices in a moving vehicle in order to enhance vehicle operator safety. A safety controller system may be operatively connected with a motion monitor within a vehicle and with a computing device in communication with the motion monitor. The safety controller system may include a motion monitor communication component for continuously receiving data from the motion monitor, which may be a GPS system installed within the vehicle. The safety controller system may additionally include a feature disabling module for disabling a feature of the electronic device based on detected motion conditions determined from the received data and a feature enabling module for enabling the feature of the electronic device based on a detected lack of motion determined from the received data.

30 Claims, 5 Drawing Sheets

Safety Controller 300 operator components 302

| temporary view component 303 | override component 304 | manual start component 306 | diagnostic screen component 308 |

System Administrator Components 310

| speed adjustment component 312 | stop time adjustment component 314 | safety log component 316 | logo customization component 318 |

System Interface Components 330

| port sharing component 332 | signal quality monitoring component 334 | motion monitor communication component 336 |

Screen disabling module 350 screen enabling module 360

SYSTEM AND METHOD FOR MOTION-BASED CONTROL OF ELECTRONIC DEVICES

CONTINUING DATA

This application is a Continuation-In-Part Application of U.S. application Ser. No. 10/875,918 filed Jun. 6, 2004, now U.S. Pat. No. 7,640,101.

TECHNICAL FIELD

Embodiments of the present invention relate to control of electronic devices based on detected motion. More particularly, embodiments of the invention are directed to disabling of distracting features of electronic devices in a vehicle while the vehicle is in motion.

BACKGROUND OF THE INVENTION

Currently, vehicles are often provided with computer equipment in order to assist vehicle operators in performance of job duties or other tasks. Often, a fleet of vehicles operated for an organization will be equipped with similar or identical computer systems.

In order to address safety concerns, organizations may often choose to disable computer screens during vehicle movement in order to ensure safe operation of the vehicle. For example, it can be distracting and dangerous for a driver to view a display screen of a laptop computer or similar device while the driver is operating a moving vehicle.

It is known to fully or partially disable a display screen of a laptop computer or other electronic device in a vehicle while the vehicle is in motion. Examples of such safety systems are disclosed in references such as U.S. Pat. Nos. 6,690,940, 6,574,531, 6,122,682, 5,949,345, 5,541,572, 5404,443, 5,148,153, and 5,032,828. The systems disclosed in these patents offer a number of advantages but are not without problems. For example, the methods disclosed in these references for determining whether a driver is operating a vehicle are generally needlessly cumbersome, expensive, and time-consuming. The disclosed systems typically call for extra equipment and complex and time-consuming installation. The disclosed systems are also typically difficult to move from one vehicle to another and require the user of sensors that must be installed or associated with axles, wheels, speedometers, parking brakes, transmissions, drive trains, or other components of the vehicles. Thus, these systems typically require specialized installation work to be performed on a vehicle to prepare the vehicle for the system. Systems relying on these types of sensors may suffer from a number of disadvantages such as undesirable wear and tear of mechanical systems and difficulty in maintaining, upgrading, repairing, and replacing such systems.

In addition to the computer equipment mentioned above, many vehicles may now be provided with a portable or onboard navigational system. Navigational systems typically include a computer, mapping or navigational software, and a Global Positioning System (GPS) receiver. The GPS receiver communicates with GPS satellites and provides a data stream, typically including a number of data fields, to the computer.

Mapping or navigational software converts the data from the GPS receiver to a user friendly format for display on the screen, often showing the location of the GPS receiver and vehicle on a map. Some vehicles are equipped with onboard navigational systems. Kits are also available that enable a laptop, personal computer, personal digital assistant (PDA) or similar electronic device to be used as a navigational system that is very easy to move from vehicle to vehicle. Such kits typically include a portable GPS receiver and navigational software. The GPS receiver may be operably connected to an electronic device in any number of different ways. For example, the GPS receiver may have a USB or serial plug 24, may include a compact flash card that fits in a card slot, typically with the help of a PCMCIA adapter, or may include wireless capabilities for a wireless connection. These mapping or navigational systems and kits also offer a number of advantages but are not without problems. For example, it can be distracting and dangerous for a driver to view a display screen of a mapping or navigational system while the driver is operating a moving vehicle. In fact, U.S. Pat. Nos. 6,574,531 and 6,266,589 both disclose the use of systems for disabling at least some functionality of GPS systems in moving vehicles.

A solution is needed for enhancing vehicle operator safety while allowing flexibility for viewing necessary information. Vehicles assigned to achieve different tasks may require different options for viewing necessary information both while moving and while stopped. It is desirable to allow both a vehicle operator and a system administrator to have some flexibility in determining the parameters of safe and necessary information retrieval. Prior systems have failed to fully appreciate the advantages of the simultaneous achievement of the objectives of safety and flexibility.

BRIEF SUMMARY OF THE INVENTION

In one aspect, a safety controller is provided for disabling distracting electronic features within a vehicle. The safety controller may be operatively connected with a motion monitor within a vehicle and with a computing device in communication with the motion monitor. The safety controller is operative to remove distracting features of an electronic device from a vehicle operator environment under predetermined conditions and may include a motion monitor communication component for continuously receiving data from the motion monitor. The safety controller may additionally include a feature disabling module for disabling a feature of an electronic device based on detected motion conditions determined from the received data and a feature enabling module for enabling the feature of the electronic device based on a detected lack of motion determined from the received data.

In an additional aspect of the invention, a method is provided for removing a distracting feature of an electronic device from a vehicle operator environment under predetermined conditions. The method may implement a safety controller operatively connected with a motion monitor within a vehicle and with a computing device in communication with the motion monitor. The method may include receiving motion data from a motion monitor within the vehicle and evaluating the motion data against the predetermined conditions in order to determine if the motion data match the predetermined conditions. The method may further include activating a feature disabling module upon determining that the motion data match predetermined conditions in order to deactivate the distracting feature. The method may additionally include conducting real time evaluation of motion data to determine if the motion data cease to match the predetermined conditions and activating a feature enabling module to enable the distracting feature if the motion data cease to match the predetermined conditions.

In yet an additional aspect of the invention, a method may be provided for removing a distracting screen display of an electronic device from a vehicle operator environment under predetermined conditions. The method may implement a safety controller operatively connected with a motion monitor within a vehicle and with a computing device in communication with the motion monitor. The method may include receiving motion data from a motion monitor within the vehicle and evaluating the motion data against the predetermined conditions to determine if the motion data match the predetermined conditions. The method may additionally include activating a screen display disabling module upon determining that the motion data match the predetermined conditions in order to deactivate the distracting feature and displaying a diagnostic screen including received motion data.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a safety control system and method for enabling and disabling distracting electronic devices based on detected vehicle movement.

Figure 1:
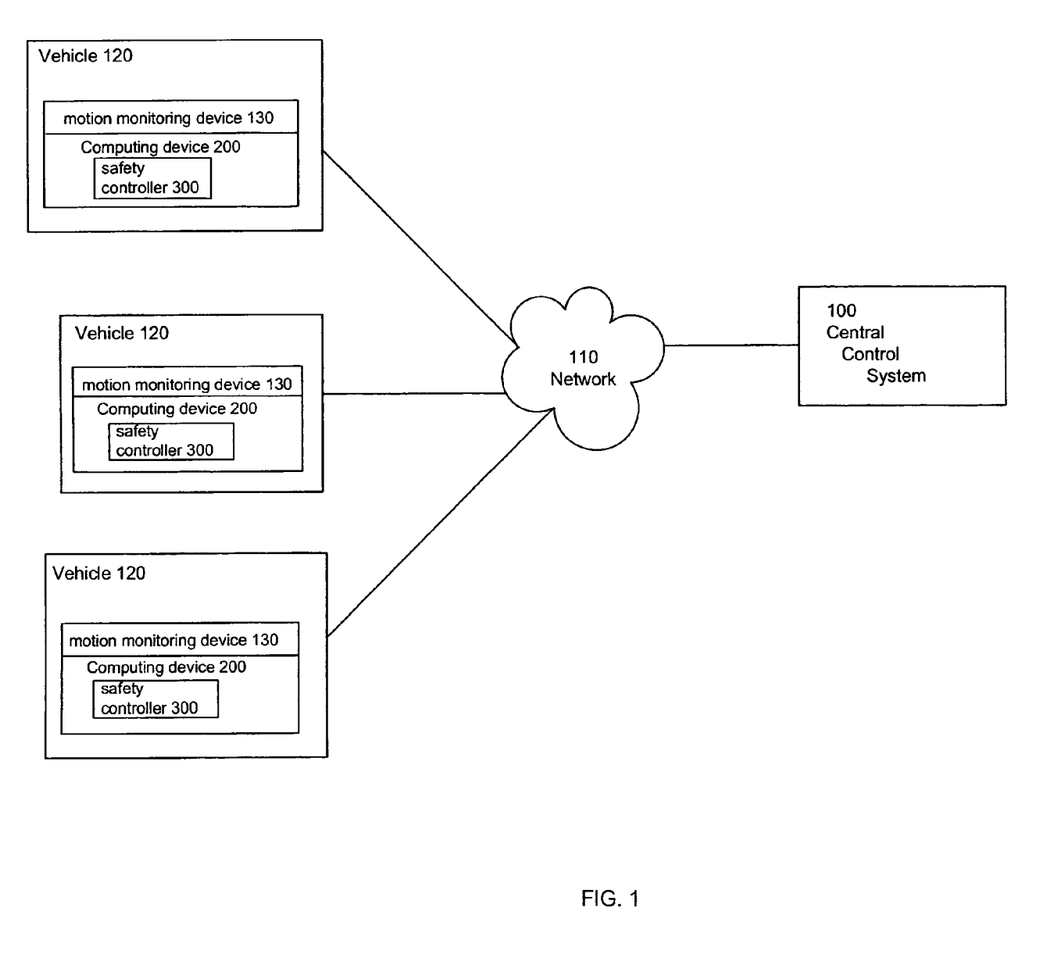
FIG. 1 is a block diagram illustrating components of a safety controller environment in accordance with an embodiment of the invention.

FIG. 1 is a block diagram illustrating components of a safety controller environment in accordance with an embodiment of the invention. In the illustrated environment, multiple vehicles 120 may be connected over a network 110 with a central control system 100. The central control system 100 may be a central dispatch system capable of communicating with the vehicles 120 using one or more modes of communication. In embodiments of the invention, the central control system 100 may be operated by an employer and each vehicle may be operated by an employee.

Each vehicle 120 may include a motion monitoring device 130. The motion monitoring device 130 may be operatively connected with a computing device 200. The computing device 200 may implement a safety controller 300 for ensuring that distracting electronic devices are disabled based on preset parameters of vehicle motion.

Although embodiments of the invention are discussed primarily in the context of use in an automobile, the vehicle 120 may be an aircraft, a watercraft, a train, a motorcycle, or any other type of mobile device or machine.

The motion monitoring device 130 may be or include a GPS system incorporated in a vehicle computing system. The GPS system may be installed internally in the vehicle 100, in the computing device 200, or in another computing device. Other configurations are possible. If external, the motion monitoring device 130 may include an external GPS connect with a serial or USB port. Alternatively, the motion monitoring device 130 may include a compact flash card that fits in a card slot, typically with the help of a PCMCIA adaptor, or may include wireless capabilities for a wireless connection.

In embodiments of the invention, the computing device 200 may include a laptop computer that links the vehicle operator to the central information system 100. The integration of the safety controller 300 in the computing device 200 may increase employee productivity and maintain the safety of the vehicle operator, pedestrians, and other motorists, and further may reduce a company's liability costs associated with traffic accidents.

The integration of laptop computers with fleet vehicles provides increased production and control of a mobile workforce. However, as is usually the case with technological advances, the computers necessitate behavioral and operational changes.

Proactive companies can take two types of measures to maintain productivity gains that computers provide while lessening driver distraction and providing a safe interaction with the public. Passive measures may include adopting and publishing company policies, such as a policy that prohibits the use of certain devices whenever a vehicle 120 is in motion or a policy that requires the distracting items be kept out of the reach or vision of the vehicle operator. Alternatively, an active approach might include automatic disabling of the computer display whenever the vehicle 120 is in motion. The safety controller 300 facilitates this active approach and decreases the chances that a vehicle operator will be distracted by data appearing on a display screen.

When the safety controller 300 is installed on the computing device 200, the motion monitoring device 130 is preferably plugged into a USB port of the computing device 200 and an appropriate corn port is detected for communicating with the motion monitoring device 130. False triggering of the motion monitoring device 130 may occur if it is moved while the vehicle is not in motion. Thus, the motion monitoring device 130 is preferably affixed to the vehicle by a technique such as hook and loop fasteners.

When motion of the monitoring device 130 is detected, data on a display screen of the computing device 200 may be temporarily disabled so that the screen is obscured. The safety controller 300 may accomplish this objective in any number of ways, such as by clearing the screen or setting a desired display element as a top window on the display screen. The desired display element may take any number of different forms, such as an image emulating a blank screen, a display element emulating a screen saver, or a display element having any other desired static or moving graphic elements. The safety controller 300 may cause the screen to remain disabled until motion stops or an override, enabling command, or interruption in data occurs as will be further explained below. When motion stops, the safety controller 300 enables the display screen, such as by setting the display element so that it is no longer the top window on the display screen. The display screen could be enabled immediately when motion ceases, but may preferably have a configurable delay, for example of approximately thirty seconds, so that the desired screen element will not rapidly appear and disappear under stop and go driving conditions.

Figure 2:
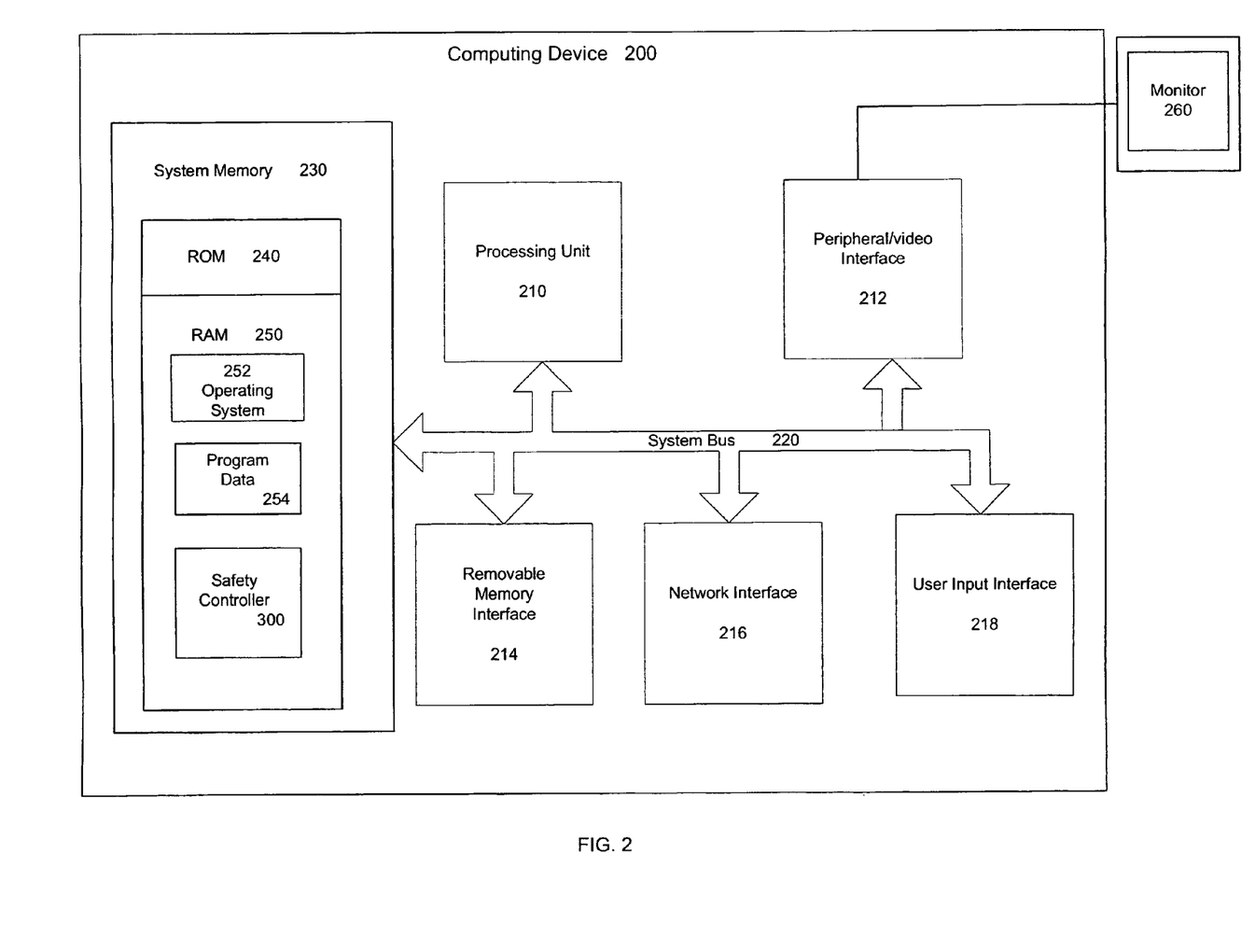
FIG. 2 is a block diagram illustrating additional components of a vehicle safety controller environment in accordance with an embodiment of the invention.

FIG. 2 is a block diagram illustrating further details of a safety controller environment in accordance with an embodiment of the invention. The computing device 200 may include a processing unit 210, a peripheral/video interface 212, a removable memory interface 214, a network interface 216, and a user input interface 218. The computing device 200 may also include a memory 230. A system bus 220 may be used to couple the aforementioned components and any other included components.

The system memory 230 may include computer storage media in the form of volatile and/or nonvolatile memory such as read only memory (ROM) 240 and random access memory (RAM) 250. A basic input/output system (BIOS), containing the basic routines that help to transfer information between elements within the computing device 200, such as during start-up, is typically stored in ROM 240. RAM 250 typically contains data and/or program modules that are immediately accessible to and/or presently being operated on by processing unit 210.

The RAM 250 may include an operating system 252, program data 254 and a safety controller 300. The safety controller 300 and any other application programs stored in RAM 250 may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including multiprocessor systems, microprocessor-based or programmable consumer electronics, minicomputers, mainframe computers, and the like.

The computing device 200 may also include other removable/non-removable, volatile/nonvolatile computer storage media. A hard disk drive may be provided that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive is typically connected to the system bus 220 through a non-removable memory interface. The magnetic disk drive and optical disk drive are typically connected to the system bus by a removable memory interface.

A user may enter commands and information through the user input interface 218 using input devices such as a keyboard and pointing device, commonly referred to as a mouse, trackball or touch pad. Other input devices may include a microphone, satellite dish, scanner, or the like. These and other input devices are often connected to the processing unit 210 through the user input interface 218 that is coupled to the system bus 220, but may be connected by other interface and bus structures, such as a parallel port or a universal serial bus (USB). A monitor 260 or other type of display device and other peripherals may also be connected to the system bus 220 via an interface, such as the peripheral interface 212.

The illustrated computing device 200 is merely an example of a suitable environment for the system of the invention and is not intended to suggest any limitation as to the scope of use or functionality of the invention. Neither should the computing device 200 be interpreted as having any dependency or requirement relating to any one or combination of components illustrated.

The computing device 200 in embodiments of the present invention may operate in a networked environment using logical connections to communicate with networked components. Logical connections for networking may include a local area network (LAN) or a wide area network (WAN), but may also include other networks. When used in a LAN networking environment, the system may be connected to the LAN through the network interface 216 or adapter. When used in a WAN networking environment, the computing device 200 typically includes a modem, a network interface, or other means for establishing communications to a WAN, such as the Internet. The modem, which may be internal or external, may be connected to the system bus 220 via the user input interface 218 or other appropriate mechanism.

Although only the computing device 200 has been described in detail with respect to the appropriate computerized environment, it should be understood that the other components shown in FIG. 1, such as the central control system 100 operate in a similar computerized environment.

Furthermore, the safety controller 300 may take any number of different forms and approaches and may be stored in any number of different manners and locations to interface with the computing device 200. For instance, the safety controller 300 may be stored on a program storage device such as a floppy disc, CD, DVD, hard drive, flash drive, or any number of different electronic storage media. In a preferred embodiment, the safety controller 300 may be stored on a hard drive of the computing device 200. In kit form, the safety controller 300 may typically be stored on CD-ROM for installation to the hard drive of the computing device 200. It should be understood that the program may be stored, distributed, and used in any number of different ways. For example, the program may be stored on a server, such as a server associated with the central control system 100, or other computer hard drive for downloading over the Internet or for downloading in any number of different known manners.

Figure 3:
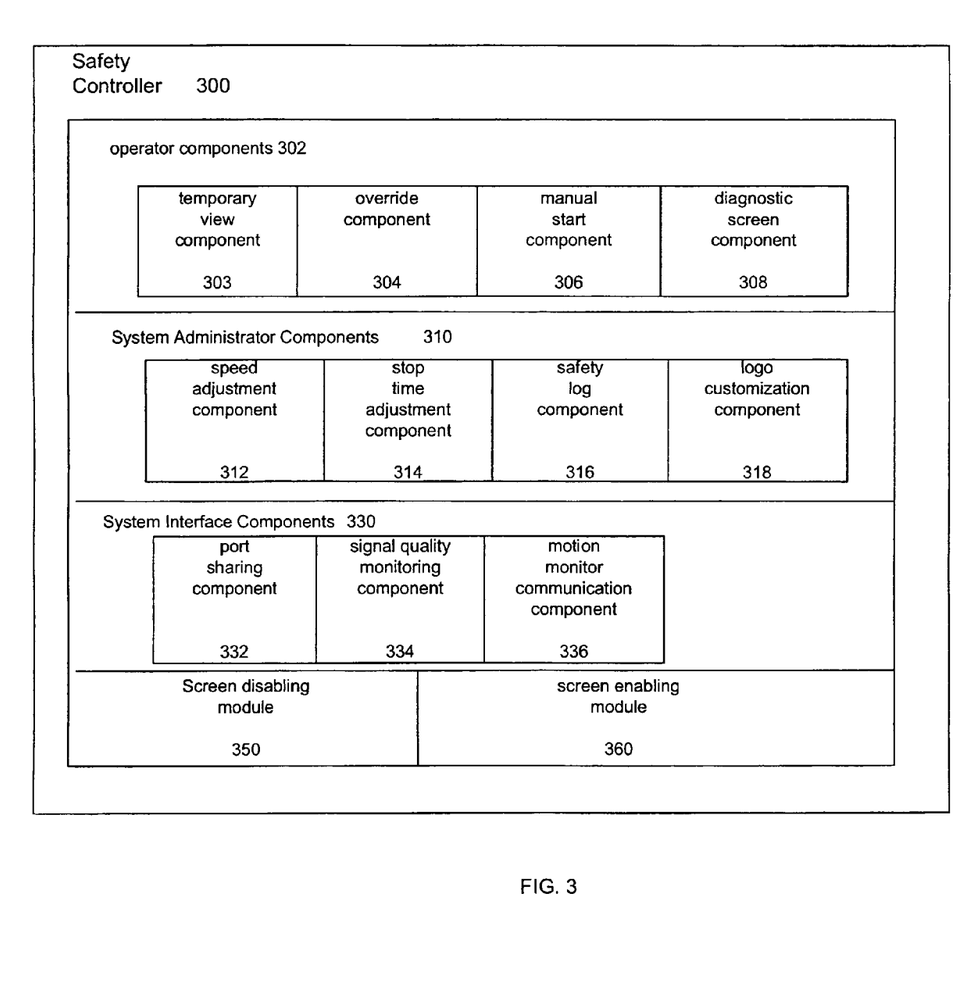
FIG. 3 is a block diagram illustrating components of a vehicle safety controller in accordance with an embodiment of the invention.

FIG. 3 is a block diagram illustrating a safety controller 300 incorporated in the computing device 200 in accordance with an embodiment of the invention. The safety controller 300 may include operator components 302 that facilitate use of the safety controller 300 by a vehicle operator. The safety controller 300 may additionally include system administrator components 310. The system administrator components 310 may be adjusted by a system administrator upon installation of the safety controller 300 on the computing device 200 or during routine maintenance operations. The safety controller 300 may additionally include system interface components 330 for interfacing with motion monitoring hardware and software.

The operator components 302 may include a temporary view component 303, an override component 304, a manual start component 306, and a diagnostic screen component 308.

As set forth above, in embodiments of the invention, a screen, such as the monitor 260 of FIG. 2, may be disabled due to vehicle motion. A temporary view component 303 may be implemented so that operators can take a peek at the screen while the vehicle is in motion. The length of time that the screen is displayed may be user definable. The temporary view component 303 is useful for emergency vehicles so the driver can get a peek at the screen while the vehicle is moving. In additional implementations, a vehicle operator may need to take a look at a map that forms part of a navigational system or may need to acknowledge receipt of an urgent message. The temporary view component 303 may enable the screen for a short period of time, such as about fifteen seconds and then disable the screen again, such as by setting the blank screen as the top window. The temporary view component 303 may be activated by a predetermined key, such as the space bar, or by a combination of key strokes. The length of time that the screen is temporarily enabled may be set by a user or system administrator. In embodiments of the invention, a system supervisor or administrator can disable this function, such as by setting the time to zero.

After the vehicle motion ceases, a pre-programmed delay may occur before the screen display is restored. In order to circumvent this pre-programmed delay and enable viewing immediately, the vehicle operator may activate the override component 304 that serves to promptly enable the screen display. In embodiments of the invention, the override component 304 may be launched by pressing a space bar on a computer keyboard. In embodiments of the invention, if a technician in a moving vehicle requires access to a next order, the technician can come to a stop, press an activation mechanism, such as a space bar, and view a next order. The screen may remain enabled until motion is once again detected.

The manual start component 306 may facilitate maintenance and may be provided as an additional alternative to traditional launching methods for the safety controller 300.

The vehicle operator may implement simple key strokes, such as by pressing two keys simultaneously, for example the "Alt" and "B" keys to launch the manual start component 306.

The diagnostic screen component 308 may be provided to the vehicle operator during a disabled mode. The diagnostic screen may be selectively actuated by the vehicle operator or alternatively may be provided as a default option. The diagnostic screen component 308 may allow the vehicle operator to display one line of data. The data may include for example, a GPS string, vehicle speed and signal integrity information as indicated by signal-to-noise-ratio (SNR) or horizontal dilution of precision (HDOP) while the screen is disabled or blacked out. This feature enables a vehicle operator to ensure proper functioning of the safety controller 300.

The system administrator components 310 may include a speed adjustment component 312, a stop time adjustment component 314, a safety log component 316, and a logo customization component 318.

Access to the system administrator components 310 may be restricted. Upon entry of validation information, a system administrator may access the components 310.

The components 310 may be accessible through a user interface that facilitates selection of settings available to the system administrator.

The speed adjustment component 312 may allow a system administrator to determine at what speed to cause the safety controller 300 to disable a computer screen.

The stop time adjustment component 314 may allow a system supervisor to set an amount of time that a vehicle needs to be at rest until the screen is restored after it has been disabled. This feature prevents the screen from flashing intermittently during traffic jams.

The safety log component 316 may be provided to track the functioning of the safety controller 300. The safety log component 316 keeps track of each time the safety controller 300 starts or stops and when communication with the motion monitor is active or inactive. The safety log component 316 may also track reception of invalid data from the motion monitor 130. The recorded safety log could be used to monitor compliance with company rules or policies. Periodic checks of the safety log generated by the safety log component 316 may ensure proper functioning of the safety controller 300.

The logo customization component 318 may allow an employer to customize a display shown to employees when the screen is blacked out or disabled by the safety controller 300. The system administrator may customize the logo to include any jpeg file.

The system interface components 330 may include a port sharing component 332, a signal quality monitoring component 334, and a motion monitor communication component 336.

The port sharing component 332 allows the safety controller 300 to share a motion monitoring or GPS receiver port with multiple applications. The port sharing component also allows the safety controller 300 to be a sole port user.

The signal quality monitoring component 334 may allow a system administrator to set a level at which a GPS signal is deemed strong enough to deliver valid information.

A higher number setting may require a stronger signal for the safety controller 300 to disable the screen. When the SNR drops below the set value and the screen is disabled, the screen may remain disabled unless a manual override occurs. This feature may prevent a constant flickering of the screen in low signal environments.

In additional embodiments of the invention, the signal quality monitoring system may utilize a dilution of precision (DOP) measurement. More particularly, the system may implement horizontal DOP (HDOP). HDOP is a GPS term that describes the geometric strength of a satellite configuration. When visible satellites are close together in the sky, the geometry is said to be weak and the HDOP value is high. When the satellites are far apart, the geometry is strong and the HDOP value is low. Factors that affect the DOP are, besides the satellite orbits, the presence of obstructions that make it impossible to use satellites in certain sectors of the local sky. Vertical DOP, position DOP, and time DOP may also be implemented. The DOP factors are functions or the diagonal elements of the covariance matrix of parameters, expressed either in global or a local geodetic frame. Similarly to the SNR readings, based on a high HDOP measurement, the reading might be discarded. In embodiments of the invention, the system must register two HDOP readings below a preset value in order for the speed reading to be accepted.

The motion monitor communication component 336 may be provided to receive and interpret data from the motion monitor or GPS receiver 130. The motion monitoring system 130 or the computing device 200 may organize the position data in the received data stream into data fields that may be comma separated fields. Although explained in connection with the motion monitor communication component 336, the mechanism for accomplishing this may be a computer program component incorporated in a GPS system or in the safety controller 300. Exemplary data fields may include: time of fix, navigation receiver warning, latitude, longitude, speed over ground, course made good, UTE date of fix, magnetic variation, and a mandatory checksum. Sample comma separated data fields may appear as follows:

Example (1)

$GPRMC,081836,A,3751.65,S,14507.36,E,000.0,360.0, 130998,011.3,E*62

Example (2)

$GPRMC,225446,A,4916.45,N,12311.12,W,000.5, 054.7,191194,020.3,E*68

The data in the data fields set forth in example (2) above provide the following information:

| | |
|---|---|
| 225466 | Time of fix 22:54:46 UTE |
| A | Navigation receiver warning A = valid position, V = warning |
| 4916.45, N | Latitude 49 deg. 16.45 min. North |
| 12311.12, W | Longitude 123 deg. 11.12 min. West |
| 000.5 | Speed over ground, knots |
| 054.7 | Course made good, degrees true |
| 191194 | UTE Date of fix, 19 Nov. 1994 |
| 020.3, E | Magnetic variation, 20.3 deg. East |
| *68 | Mandatory checksum |

For quality control, compatibility, and other purposes, it may be desirable to restrict use to only approved GPS receivers. One technique for restricting use to approved GPS receivers is to disable a proprietary combination of unneeded data fields so that the GPS receiver does not provide data in the selected data fields.

The motion monitoring device 130 or the motion monitoring communication module 336 may monitor the data stream to determine whether the appropriate combination of data fields has been disabled and may include instructions that render the safety controller 300 operable only if the appropriate combination of data fields has been disabled. For example, if a user attempts to use a non-approved receiver that transmits data in all data fields, the system would detect that the data stream from the non-approved receiver includes data in one or more of these fields in which no data is expected. Upon detecting the data presence, the safety controller would fail to implement. It is of course understood that no data fields need to be disabled and that any number of techniques may be used to limit operation of the safety controller 300 for use with approved motion monitors 130.

The safety controller 300 may also include a screen disabling component 350 and a screen enabling component 360. As explained above, upon detection of motion, the screen disabling component 350 disables a distracting computer screen, which may be the screen 260 of FIG. 2. When motion has stopped, the screen enabling component 360 enables the screen to allow vehicle operator viewing. When the screen disabling component 350 disables the screen display, all processes of the computing device 200 continue with normal functionality. For example, orders can be transferred and sound alerts can be generated by MDSI or commercially available mapping software. The screen disabling component 350 may respond to motion detection by calling a set of desired graphics element as a top window on the desktop of the screen 260. For example, a function such as "CallSetWindowPos(frmMain.hwnd, HWND_TOPMOST, 0&, 0&, gDispRec.Right, gDispRec.Bottom, SWP_SHOWWINDOW)" may be implemented. In this manner, the display screen is blacked out, but the computing device 200 otherwise remains fully functional. For example, applications can continue to run and emails and other communications can still be sent and received. The type of disabling performed may involve simply blanking or blacking out the display screen of the computing device 200, but as set forth above, may include the display of a customized logo. Furthermore, the safety controller 300 allows for great flexibility and may be used in connection with any number of other devices, particularly electronic devices. Similarly, the disabling may be full or partial and may be applied to any number of different features of the computing device 200.

While the screen is disabled, the safety controller 300 continues to monitor speed data to detect when motion ceases. The safety controller also monitors for commands. If an override command is detected, the safety controller 300 determines whether the motion monitor 130 still detects motion. If motion is detected, the safety controller 300 may immediately enable the display screen, such as by removing the desired graphic element from the top window, and adds a time delay for a predetermined length before the safety controller 300 determines whether it is again appropriate to disable the screen. If no motion is detected when the override command is received, the safety controller 300 may immediately enable the display screen by removing the desired graphic element from the top window and may immediately resume monitoring for motion for determining whether it is appropriate to disable the screen. The same delay used when motion is detected may also be used when motion is not detected.

In order for the screen disabling component 350 and the screen enabling component 360 to make determinations, the data received from the motion monitor 130 is interpreted by the safety controller 300. The motion monitor 130 transmits a data stream to the computing device 200 and the safety controller 300 parses the data stream to read data from a speed over ground data field to detect movement of the motion monitor 130. The system may be configured so that motion is detected in any number of ways. For example, the safety controller 300 may monitor data from the speed over ground and may disable one or features of the computing device 200 only when the speed data indicates that a speed exceeds a predetermined value. This predetermined value may be set by a system administrator with the speed adjustment component 312. The speed may be set to zero knots. However, to avoid false triggering, the speed is preferably set to a number greater than zero knots. For example, the predetermined value may be set so that it is less than or equal to approximately one knot per second and is more preferably set so that it is less than or equal to 5 knots. Additional settings may also be available for avoiding false triggering. For example, the screen enabling component 360 may require that a non-zero speed be detected for a minimum period of time or for a minimum number of consecutive readings, such as for at least approximately five seconds or for at least approximately three seconds. This avoids momentary false readings that may occur inadvertently.

Furthermore, fields other than speed over ground may be implemented to control disabling and enabling. For example, data streams may be monitored for changes in latitude and longitude, for changes in direction, for changes in acceleration, or for any other data that might tend to indicate motion. Aany combination of fields may be monitored to increase accuracy and reduce false triggering. For example, the safety controller 300 may monitor speed, latitude, and longitude and may disable the feature only in response to a combination of both a non-zero speed reading and either a change in longitude or latitude.

Figure 4:
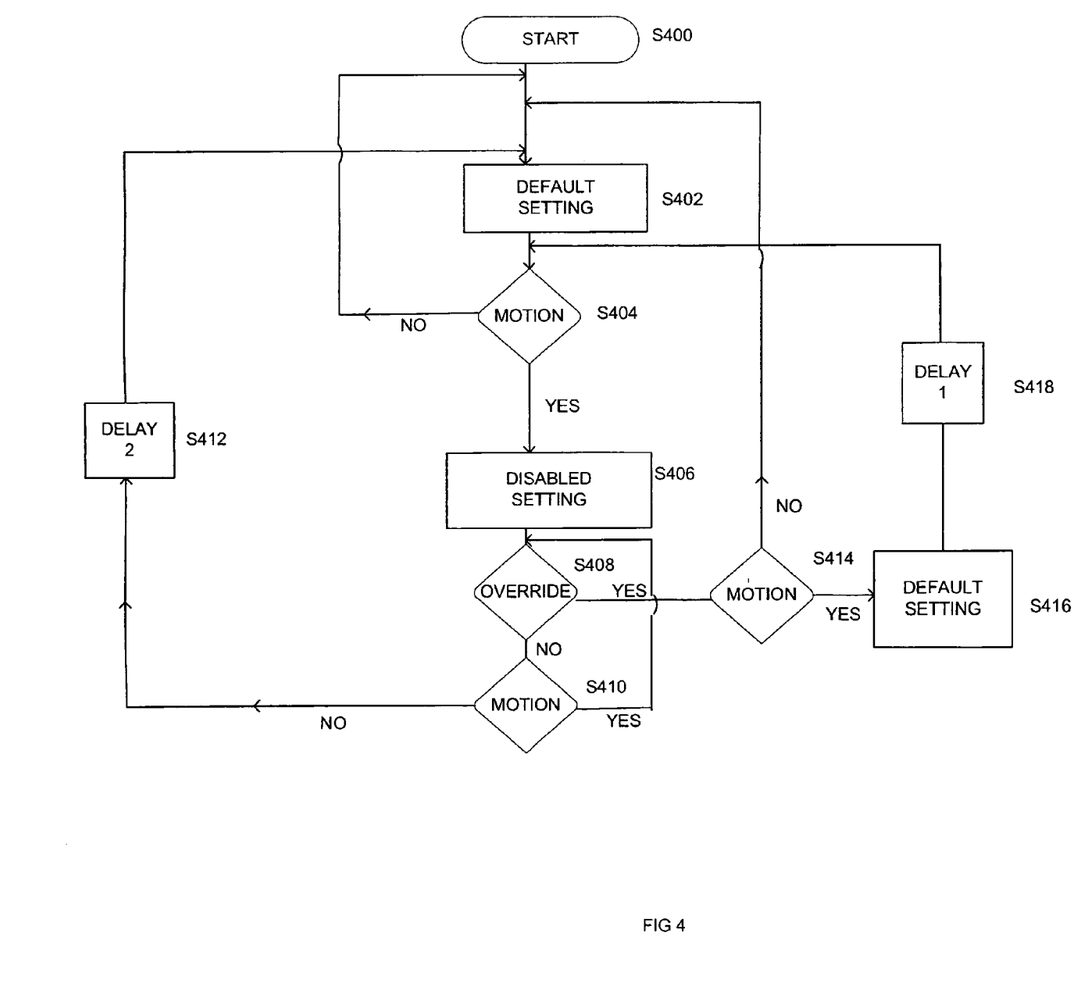
FIG. 4 is a flow chart illustrating a method in accordance with an embodiment of the invention.

FIG. 4 is a flow chart illustrating a method in accordance with an embodiment of the invention. The method begins in S400 and the safety controller remains in a default mode, for example, in which a computer screen is in an enabled state in S402. In S404, a motion decision is made based on received signals and signal quality determination as set forth above. If no motion is detected, the system remains in default enabled mode. If motion is detected in S404, the screen disabling module 350 disables the screen in S406. The screen remains disabled unless an override is detected in S408 or motion is detected in S410. If an override is detected in S408 and no motion is detected in S414, the screen is enabled. If motion is detected in S414, the screen may be in enabled in S416 in compliance with the override request and a preset delay may be implemented in S418.

In the absence of an override request in S408, if no motion is detected in S410, a pre-selected delay period may be implemented before enabling the screen and returning to the default state of S402. Although the default mode is described in connection with FIG. 4 as an enabled mode, the default mode may also be the disabled mode.

Figure 5:
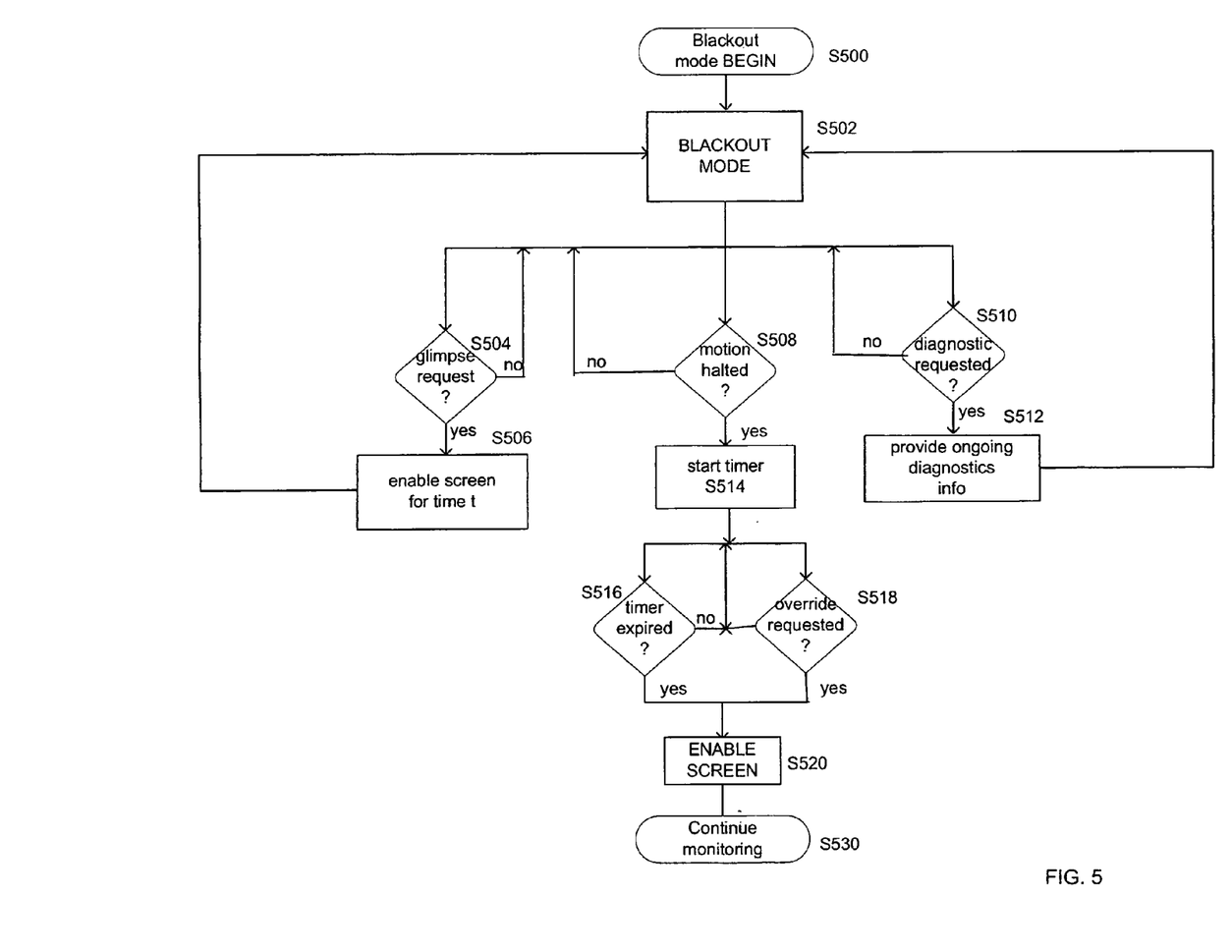
FIG. 5 is a flow chart illustrating an additional method in accordance with an embodiment of the invention.

FIG. 5 illustrates an additional method in accordance with an embodiment of the invention. The method begins at S500 and the screen is in disabled or blackout mode in S502. The system components monitor for a set of events during disabled mode. In S504, the system determines if the vehicle operator has requested a temporary view of the screen. If a temporary view is requested in S504, the safety controller enables the screen in S506 for a preset time (t).

In S510, the system may receive a diagnostic request. If such a request is received, the safety controller provides the vehicle operator with ongoing diagnostics information in S512. Although illustrated in the method as requested by the user, the diagnostics screen may also be displayed as a default setting.

In S508, the safety controller continues monitoring for motion. If motion is halted in S508, the safety controller 300 may start a timer for a predetermined time period (t). If the timer has expired in S516 or an override is requested in S518, the screen is enabled in S520 and monitoring continues in S530.

An objective of the safety controller 300 is to assure that each operator and system administrator have a maximum amount of flexibility for configuring laptop computers while also providing safety for companies and drivers. The safety controller 300 may be provided as a companion product for a laptop computer or other devices that use an active video screen. The motion activated safety controller may automatically remove the distraction of the video screen while the vehicle is in motion without interfering with the transfer of voice or data information. The safety controller facilitates compliance with currently enacted distracted driver laws.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A safety controller system operatively connected with a motion monitor within a vehicle and with a computing device in communication with the motion monitor, wherein the safety controller system is operative to remove a distracting feature of an electronic device from a vehicle operator environment under predetermined conditions, the safety controller system comprising:
   a motion monitor communication component for continuously receiving data from the motion monitor;
   a feature disabling module for disabling the distracting feature of the electronic device based on detected motion conditions determined from the received data; and
   a feature enabling module for enabling the distracting feature of the electronic device based on a detected lack of motion determined from the received data.

2. The system of claim 1, wherein the motion monitor comprises a GPS receiver.

3. The system of claim 1, wherein the distracting feature comprises a screen display.

4. The system of claim 1, further comprising vehicle operator control components for facilitating vehicle operator control of the safety controller system.

5. The system of claim 4, wherein the vehicle operator control components comprise a temporary view component that allows a vehicle operator to temporarily view the distracting feature during vehicle motion.

6. The system of claim 1, further comprising system administrator components for facilitating setting of the predetermined conditions.

7. The system of claim 6, wherein the system administrator components comprise a speed adjustment component for allowing selection of a threshold speed to be met prior to activation of the feature disabling module.

8. The system of claim 6, further comprising a stop time adjustment component for allowing pre-selection of a set time period for delaying enablement of a distracting feature after lack of motion is determined.

9. The system of claim 6, further comprising a logo customization component for allowing selection of a display in place of the distracting feature.

10. The system of claim 2, further comprising a signal quality monitoring component for monitoring HDOP prior to confirming motion conditions.

11. The system of claim 2, further comprising a port sharing component for allowing the safety controller system to share a GPS port.

12. A method for removing a distracting feature of an electronic device from a vehicle operator environment under predetermined conditions, the method implementing a safety controller operatively connected with a motion monitor within a vehicle and with a computing device in communication with the motion monitor, the method comprising:
   receiving motion data from a motion monitor within the vehicle;
   evaluating the motion data against the predetermined conditions in order to determine if the motion data match the predetermined conditions;
   activating a feature disabling module upon determining that the motion data match predetermined conditions in order to deactivate the distracting feature;
   conducting real time evaluation of motion data to determine if the motion data cease to match the predetermined conditions; and
   activating a feature enabling module to enable the distracting feature if the motion data cease to match the predetermined conditions.

13. The method of claim 12, wherein receiving the motion data comprises receiving GPS data from a GPS receiver.

14. The method of claim 12, wherein the distracting feature comprises a screen display.

15. The method of claim 12, further comprising providing vehicle operator control components for facilitating vehicle operator control of the safety controller system.

16. The method of claim 15, further comprising providing a temporary view component that allows a vehicle operator to temporarily view the distracting feature during vehicle motion.

17. The method of claim 12, further comprising providing system administrator components for facilitating setting of the predetermined conditions.

18. The method of claim 17, further comprising providing a speed adjustment component for allowing selection of a threshold speed to be met prior to activation of the feature disabling module.

19. The method of claim 18, further comprising providing a stop time adjustment component for allowing pre-selection of a set time period for delaying enablement of the distracting feature after lack of motion is determined.

20. The method of claim 18, further comprising providing a logo customization component for allowing selection of a customized display in place of the distracting feature.

21. The method of claim 13, further comprising monitoring HDOP prior to confirming motion conditions.

22. The method of claim 13, further comprising allowing the safety controller system to share a GPS port.

23. A method for removing a distracting screen display of an electronic device from a vehicle operator environment under predetermined conditions, the method implementing a safety controller operatively connected with a motion monitor within a vehicle and with a computing device in communication with the motion monitor, the method comprising:

receiving motion data from a motion monitor within a vehicle;

evaluating the motion data against the predetermined conditions to determine if the motion data match the predetermined conditions;

activating a screen display disabling module upon determining that the motion data match the predetermined conditions in order to deactivate the distracting screen display; and displaying a diagnostic screen including motion data.

24. The method of claim 23, wherein receiving the motion data comprises receiving GPS data from a GPS receiver.

25. The method of claim 23, further comprising providing vehicle operator control components for facilitating vehicle operator control of the safety controller system.

26. The method of claim 25, further comprising providing a temporary view component that allows a vehicle operator to temporarily view the distracting screen display during vehicle motion.

27. The method of claim 23, further comprising providing system administrator components for facilitating setting of the predetermined conditions.

28. The method of claim 27, further comprising providing a speed adjustment component for allowing selection of a threshold speed to be met prior to activation of the screen display disabling module.

29. The method of claim 27, further comprising providing a stop time adjustment component for allowing pre-selection of a set time period for delaying enablement of the screen display after lack of motion is determined.

30. The method of claim 18, further comprising providing a logo customization component for allowing selection of a customized display in place of the screen display.

* * * * *